US007077314B2

(12) United States Patent
Johnson

(10) Patent No.: US 7,077,314 B2
(45) Date of Patent: Jul. 18, 2006

(54) METHODS AND SYSTEMS FOR VOTER-VERIFIED SECURE ELECTRONIC VOTING

(75) Inventor: Richard C. Johnson, East Setauket, NY (US)

(73) Assignee: Oracle International Corporation, Redwood Shores, CA (US)

( * ) Notice: Subject to any disclaimer, the term of this patent is extended or adjusted under 35 U.S.C. 154(b) by 27 days.

(21) Appl. No.: 11/005,109

(22) Filed: Dec. 6, 2004

(65) Prior Publication Data

US 2005/0218225 A1 Oct. 6, 2005

Related U.S. Application Data

(60) Provisional application No. 60/558,751, filed on Mar. 31, 2004.

(51) Int. Cl.
*G06F 16/60* (2006.01)

(52) U.S. Cl. ........................................ 235/386; 705/12

(58) Field of Classification Search ................ 235/386, 235/380, 51, 50; 705/12

See application file for complete search history.

(56) References Cited

U.S. PATENT DOCUMENTS

| | | | | |
|---|---|---|---|---|
| 4,813,708 | A | 3/1989 | Narey | |
| 5,878,399 | A * | 3/1999 | Peralto | 705/12 |
| 6,769,613 | B1 | 8/2004 | McDermott et al. | |
| 2002/0091673 | A1* | 7/2002 | Seibel et al. | 707/1 |
| 2003/0158775 | A1* | 8/2003 | Chaum | 705/12 |
| 2003/0178484 | A1 | 9/2003 | Vadura et al. | |
| 2004/0046021 | A1 | 3/2004 | Chun | |
| 2004/0140357 | A1 | 7/2004 | Cummings | |
| 2004/0169077 | A1 | 9/2004 | Petersen | |
| 2004/0217168 | A1* | 11/2004 | Cummings | 235/386 |
| 2004/0238632 | A1* | 12/2004 | Homewood et al. | 235/386 |
| 2005/0056698 | A1* | 3/2005 | Cummings et al. | 235/386 |

OTHER PUBLICATIONS

R. Mercuri, "A Better Ballot Box?" IEEE Spectrum, 39(10):46-50 (Oct. 2002).

H. Riebeek, "Brazil holds all-electronic national election" IEEE Spectrum, 39 (11):25-26 (Nov. 2002).

* cited by examiner

*Primary Examiner*—Thien M. Le
*Assistant Examiner*—Edwyn Labaze
(74) *Attorney, Agent, or Firm*—Young Law Firm, P.C.

(57) ABSTRACT

Votes are cast using an electronic voting machine that is configured to transmit the votes cast in electronic form and to memorialize the votes in a persistent and tangible form (such as a printed paper ballot, for example) that is both machine and human readable. To ensure that the voter has the ability to verify that his or her completed ballot accurately reflects his or her voting choices, the present voting machine is configured to securely present the printed ballot for the voter's visual inspection prior to finalizing the voting process. The present electronic voting machine is preferably configured with a read-after-write functionality, wherein one or more scanners read what the voting machine's print head prints, during or immediately after the printing process. The present voting systems and methods are configured such that the voting procedures for absentee and non-absentee voters are parallel and identical, except that the voting card is carried by the absentee voter and not limited to the local polling place.

43 Claims, 5 Drawing Sheets

METHODS AND SYSTEMS FOR VOTER-VERIFIED SECURE ELECTRONIC VOTING

CROSS REFERENCE TO RELATED APPLICATIONS

This application claims the benefit of priority under 35 U.S.C. §119(e) of provisional application Ser. No. 60/558,751, filed Mar. 31, 2004.

BACKGROUND OF THE INVENTION

1. Field of the Invention

The present inventions relate generally electronic voting methods and systems.

2. Description of the Prior Art and Related Information

Conventional voting systems rely upon pre-printed paper ballots and locked ballot boxes. An intermediate generation of technology uses punch cards (e.g., IBM punch cards). These machines have become notorious for ambiguous results from so-called hanging, dimpled or pregnant chads, such as can occur when the machine fails to completely punch out the voter's choice. With such punch cards, recounts are possible either by machine or by hand, but ambiguous cards, faulty mechanisms and the variability introduced by human judgment all influence the outcome of the recount. Newer electronic voting machines include eletromechanical devices that record entries within the machine itself. No printed record of the vote remains in such machines, making recounts difficult. Most recently, states have begun to deploy computer-based voting systems, where the human interface includes, for example, touch screens or other input means. Many of these computer-based voting systems have no provisions for generating a tangible record of the votes. This renders recounts difficult, impossible or all too easy, depending on one's point of view. Indeed, in most cases, recounts carried out using such computer-based systems result in exactly the same result each time a recount is carried out, as the algorithm for processing the votes is fixed, rendering the outcome of the recount wholly invariant and deterministic.

One of the main problems with electronic voting machines that do not generate an independently verifiable tangible record of the cast vote is that the voter cannot be certain that the machine actually stored a vote corresponding to the voter's intent. Without some independent tangible record of the voter's intentions, the votes cast in such machines are susceptible to fraud, manipulation and loss. Moreover, changes made after testing or certification to the hardware, software, or firmware of the system or errors in the machine's programming, whether unintentional or ill intentioned, may change the ultimate vote tally and even the result of an election.

Current voting methods are also deficient in terms of absentee ballots. Indeed, absentee ballots are slow to count, cumbersome, expensive to administer and easy to misuse. Fraud is also a concern with absentee ballots, in that it is difficult to ensure against compensation or other voting rule violations by voters and/or their manipulators. This is due to the basic nature of absentee ballots. Voters receive absentee ballots by applying to local voting authorities after having undergone the standard registration procedures. The voters are then typically mailed paper ballots, and from this point on, the paper ballot are effectively outside of the control and supervision of the election officials. The absentee voter may then mark the ballot and mail it back to the local election authorities, signing the exterior of the envelope in order to enable matching to the signature on the voting registration card. This procedure represents a major contrast in security, as compared to the act of voting in a booth under the supervision of poll watchers and officials. That the absentee ballots are mailed by the local election authorities and returned by the voter means that counting absentee ballots will be slow and that they are subject to copying or completion by others while in the supposed custody of the voter (an invitation to vote purchase and other voting fraud), and subject to uncertain conveyance back to the voting authorities. Many states allow return of such ballots through ordinary mail, direct return by self or family or friends, or other insecure means.

Thus, absentee ballots have frequently been the source of problems in close elections, because the result may be uncertain or unknown for a long time pending a definitive count of the absentee ballots or because of suspected or actual voting fraud. Moreover, the inherent difficulties of securing an absentee ballot, completing it, and returning it prior to the close of voting in the voter's local area prevent the votes of many potential absentee voters from being recorded. For civilians traveling or residing abroad, international voting must take place in cooperation with US embassies and consulates. For military personnel stationed abroad, voting takes place in cooperation with the service member's unit. No soldier tasked with defense of his or her country should be deprived of a vote. At the same time, confidentiality and validity are issues not always well served by conventional paper balloting away from poll watchers and other local election officials. Time is of the essence, and properly protected, valid, and effective systems of electronic voting remain to be implemented in practice.

SUMMARY OF THE INVENTION

According to an embodiment thereof, the present invention is an electronic voting machine that includes a user interface configured to enable a voter to enter voting choices; a display for displaying the user interface and the voting choices; a print mechanism configured to print the voting choices on a paper ballot, and a scanner assembly attached to the print mechanism to scan the printed voting choices on the paper ballot immediately after the print mechanism prints the voting choices on the paper ballot so as to generate an electronic version of the voting choices that are printed on the paper ballot.

The print mechanism and the scanner assembly may be configured to operate simultaneously. The scanner assembly may be attached to the trailing edge of the print mechanism to enable the scanner assembly to scan the voting choices immediately after the print mechanism prints the voting choices on the paper ballot. The print mechanism may be unidirectional. Alternatively, the scanner assembly may include a first scanner attached to a first side of the print mechanism and a second scanner attached to a second side of the print mechanism to scan the voting choices immediately after the print mechanism prints the voting choices on the paper ballot irrespective of a direction of travel of the print mechanism. The electronic voting machine may further include memory for storing the generated electronic version of the voting choices and the voting choices entered by the voter through the user interface. The electronic voting machine may further include means for securely sending the voting choices entered by the voter through the user interface and the generated electronic version of the voting choices scanned from the paper ballot to a remote database.

The display may include a touch screen. The voting machine may further include a box configured to hold the printed paper ballots. The electronic voting machine may further include a magnetic card reader configured to accept and read a voter-issued magnetic card. The electronic voting machine may be further configured to erase the voter-issued magnetic cards.

The present invention is also a computer-implemented method of recording voter choices using an electronic voting machine. According to an embodiment, the method may include steps of presenting the voter with a plurality of voting choices via an electronic user interface; accepting the voter's choices and storing the voter's choices; printing a paper ballot that reflects the voter's choices, the paper ballot including at least one of printed human and machine-readable indicia and, while the paper ballot is being printed, optically scanning the just printed indicia to generate an electronic version of the voter's choices that are printed on the paper ballot, and storing the generated electronic version of the voting choices printed on the paper ballot.

The method may further include a step of identifying the voter prior to the accepting step. A step of accepting a voter identification card presented by the voter and reading the accepted voter identification card may also be carried out. The method may also include a step of erasing the accepted voter identification card. The voter in the accepting step may an absentee voter. The method may also include a step of determining whether the voter having presented the voter identification card is entitled to vote from information obtained during the reading step. A step of determining which ballot the voter is entitled to use from information obtained during the reading step may also be carried out. The printing step may print out only the ballot that the voter is entitled to use (the printed ballot may be an absentee ballot or may be a ballot of a remote voting district, for example). The accepting step may be carried out via a touch screen on the electronic voting machine, for example. The method may also include steps of showing to printed ballot to the voter; obtaining a confirmation from the voter that the printed ballot is accurate, and validating the voter's choices only upon obtaining the voter's confirmation that the printed ballot is accurate. The electronic voting machine may include a transparent window and wherein the showing step may be carried by showing the printed ballot (or an image thereof) to the voter through the window. The method may also include steps of sending the stored voter's choices obtained via the user interface to a remote database, and sending the generated electronic version of the voter's choices printed on the paper ballot to the remote database. The electronic voting machine may include a touch screen and wherein the presenting and accepting steps may be carried out using the touch screen.

The present invention may also be viewed as a machine-readable medium having data stored thereon representing sequences of instructions which, when executed by a computing device, causes the computing device to record voter choices using an electronic voting machine, by carrying out steps including presenting the voter with a plurality of voting choices via an electronic user interface; accepting the voter's choices and storing the voter's choices; printing a paper ballot that reflects the voter's choices, the paper ballot including at least one of printed human and machine-readable indicia and, while the paper ballot is being printed, optically scanning the just printed indicia to generate an electronic version of the voter's choices that are printed on the paper ballot, and storing the generated electronic version of the voting choices printed on the paper ballot.

According to another embodiment thereof, the present invention is a computer system for recording voter choices using an electronic voting machine, the computer system including at least one processor; at least one data storage device coupled to the at least one processor; a plurality of processes spawned by said at least one processor, the processes including processing logic for: presenting the voter with a plurality of voting choices via an electronic user interface; accepting the voter's choices and storing the voter's choices; printing a paper ballot that reflects the voter's choices, the paper ballot including at least one of printed human and machine-readable indicia and, while the paper ballot is being printed, optically scanning the just printed indicia to generate an electronic version of the voter's choices that are printed on the paper ballot, and storing the generated electronic version of the voting choices printed on the paper ballot.

DETAILED DESCRIPTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Embodiments of the voting mechanism described herein benefit from the advantages of both electronic voting machines and paper balloting systems while suffering from the disadvantages of neither. Indeed, the embodiments of the present invention disclosed herein enjoy the speed of electronic voting and benefit from the security measures available from trusted institutions. Votes may be safely transmitted in electronic form and are memorialized in a persistent and tangible form that is preferably both machine and human readable to enable both a machine recount and a human manual recount, if needed or requested.

Figure 1:
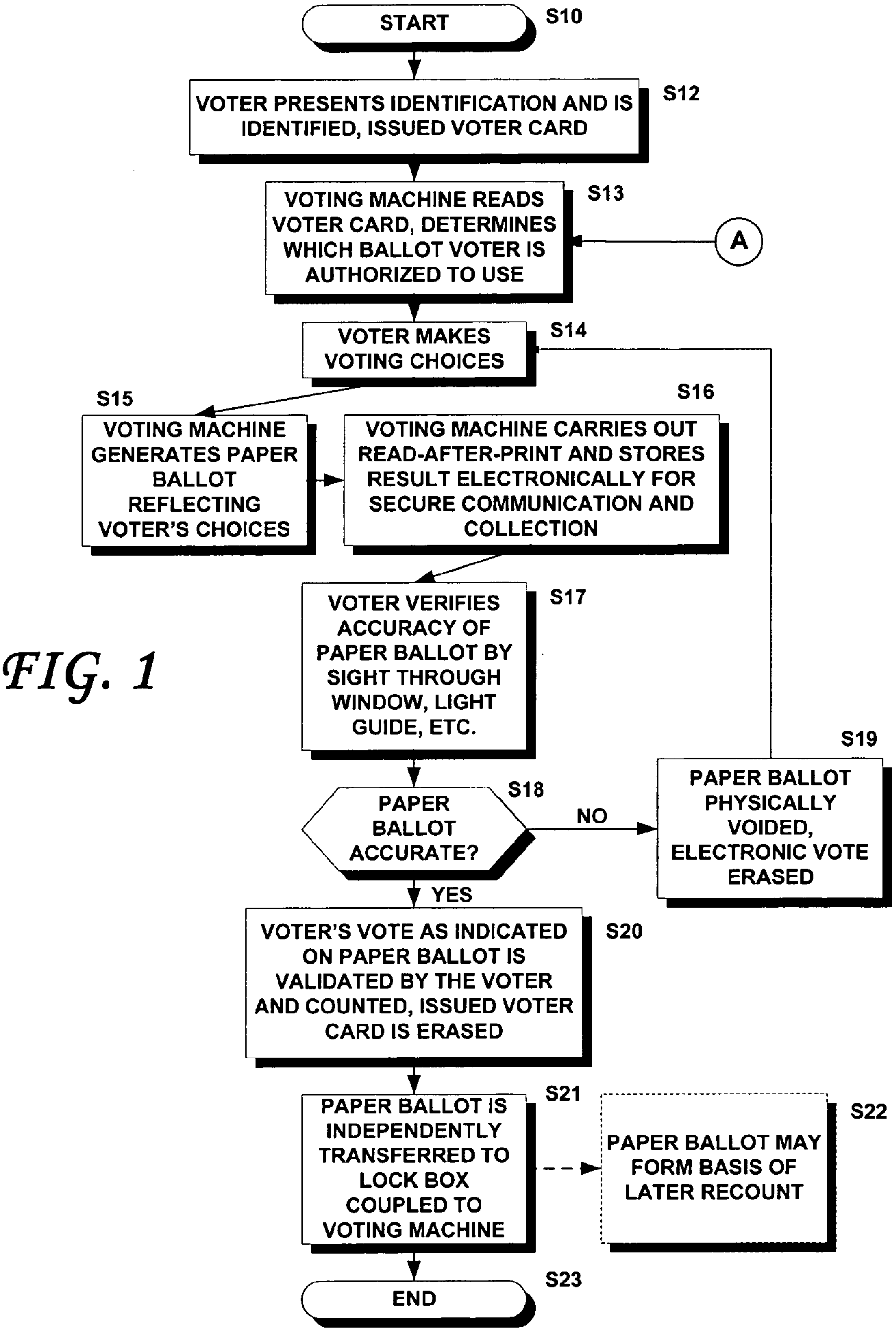
FIG. 1 is a flowchart illustrating aspects of the present voting method, according to an embodiment of the present invention.

FIG. 1 is a flowchart illustrating aspects of the present voting method, according to an embodiment of the present invention. The method starts at S10. According to an embodiment of the present invention, after having been identified as a registered voter, the voter is given a voter-specific card containing information on the appropriate ballot for this voter and authorization for the voting machine to accept the voter, as shown at S12. The voter then presents the issued voter-specific card to the voting machine. The voting machine reads the voter-specific card presented, identifies the voter as shown at S13 and may carry out other steps (such as securely matching the voter against a list of authorized voters, for example). As also called for in step S13, from the information read from the presented voter-specific card, the present voting machine determines which ballot the voter is approved to use. Indeed, the present voting machine may be configured to produce unique ballots, with the parameters stored in the voter-specific card informing the voting machine which ballot to use and display for the voting. Such functionality enables the voting machine to be used in conjunction with multiple ballots and enables the present voting machine to determine which ballot the voter is entitled to use. This ability is important in the context of absentee voting, among other situations. For example, the ability to determine which ballot the voter is entitled to use is critical in the case of remote polling places used by absentee voters and in cases where voting machines are used for multiple primary voting on the same day. According to embodiments of the present invention, the ballot (both electronic and paper) may be a general form ballot that is made specific by the information retrieved from the presented voter-specific card (or token). The present voting machine allows the voter to vote by means of, for example, a touch screen or other input means. Once the voter has indicated, through some user interface or input means, that he or she has finished voting as shown at S14, the voter's choices are recorded in a secure data store. At this point, separate data paths are created, as discussed in detail below. After the voter has made his or her voting choices, the present electronic voting machine generates and prints out a paper ballot as shown at S15 and S16 before finalizing the voting process. Two separate data paths (one data path stemming from electronic data obtained through the user's interaction with the user interface and recording the voter's choices, and the other expressed solely by the generated paper ballot) exist at this point. The paper ballot is then presented for the voter's visual inspection as called for by step S17, but is not given to the voter. The voter may then look at and examine the printed ballot (but has no physical access thereto) to ensure that the printed ballot accurately memorializes the choices the voter has just made through the touch screen or other input means. That is, the present electronic voting machine obtains the informed consent of the voter that he or she intends to vote as shown on the printed ballot. To insure that the printed ballot is visible but otherwise inaccessible to the voter, the paper ballot may be presented to the voter behind a transparent window of the voting machine. Alternatively, the paper ballot may be presented to the voter's visual inspection through a system of, for example, mirrors, fiber optics, light guides and/or by other means. At S18, the voter indicates whether the paper ballot presented to the voter's visual inspection accurately reflects the voter's intent. If the paper ballot is inaccurate (NO branch of S18), the paper ballot is physically voided in some irrevocable manner and the electronic vote is erased as called for by step S19, whereupon the method may revert to step S14 to enable the voter to try again. After the voter indicates that the paper ballot conforms to the voter's choices (YES branch of S18), as shown at S20, the electronic vote is validated by the voter touching the appropriate part of the screen or by carrying out some other positive action, and the voter-issued card issued in step S12 is erased. Once validated by the voter's action, the electronic vote may be stored for later secure transmission to a centralized database from which the vote tally may be obtained. After the voter has inspected and approved the paper ballot and the electronic vote has been locally stored and/or transmitted to the centralized database, the paper ballot, as called for by step S21, may then be conveyed automatically and without human intervention, to a locked and numbered box. Although the paper ballots may then be transferred from the lockbox for further handling and processing, the present method, from the voter's point of view, ends at step S23. As shown at S22, the paper ballots may form the basis for a later recount or audit.

Figure 2:
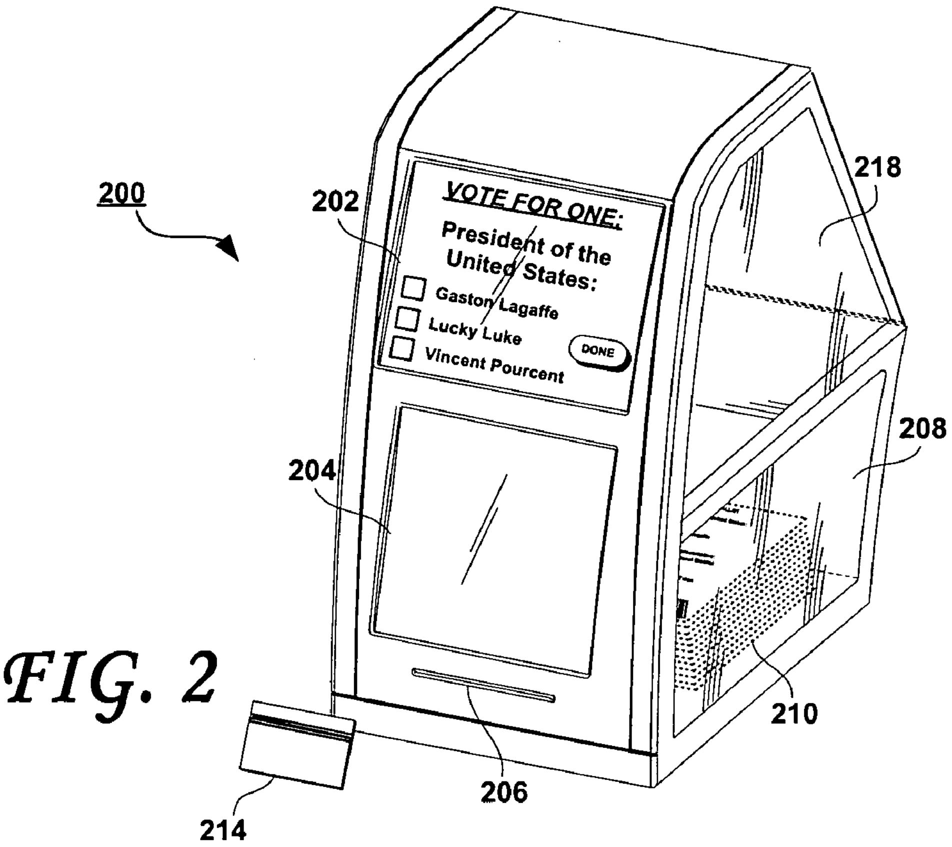
FIG. 2 shows an exemplary voting machine in a first state, according to an embodiment of the present invention.

FIG. 2 shows an exemplary voting machine 200 in a first state, according to an embodiment of the present invention. It is to be noted that the electronic voting machine 200 illustrated in FIG. 2 is but a conceptual rendering of the appearance and selected functional aspects of a possible electronic voting machine according to an embodiment of the present invention, and that the actual implementation thereof may bear little resemblance to the appearance of the devices illustrated herein. As shown in FIG. 2, the present electronic voting machine 200 may be standalone unit that may include a touch screen 202, a transparent window (or fiber optics, light guide or other means for enabling a visual inspection of the generated paper ballot) 204, a voter card slot 206, an electronics compartment 218 containing the machine's print mechanism and controllers, a lockbox 208 (may be an integral part of the voting machine 200 or may be a lockbox that is removably coupled to the voting machine 200). The lockbox 208 may be configured to contain a plurality (e.g., a stack 210) of voter-completed and validated printed ballots 212. In use, the present electronic voting machine 200 may accept the voter's card 214, decrypt and store identification information and ballot configuration information as well as local voting authority address and other information stored thereon, and erase the card, for reasons developed below. Thereafter, the voter, as shown in FIG. 2, may be prompted to make his or her voting choice or choices by, e.g., touching the touch screen 202, thereby making his or her selection from the choices provided.

Figure 3:
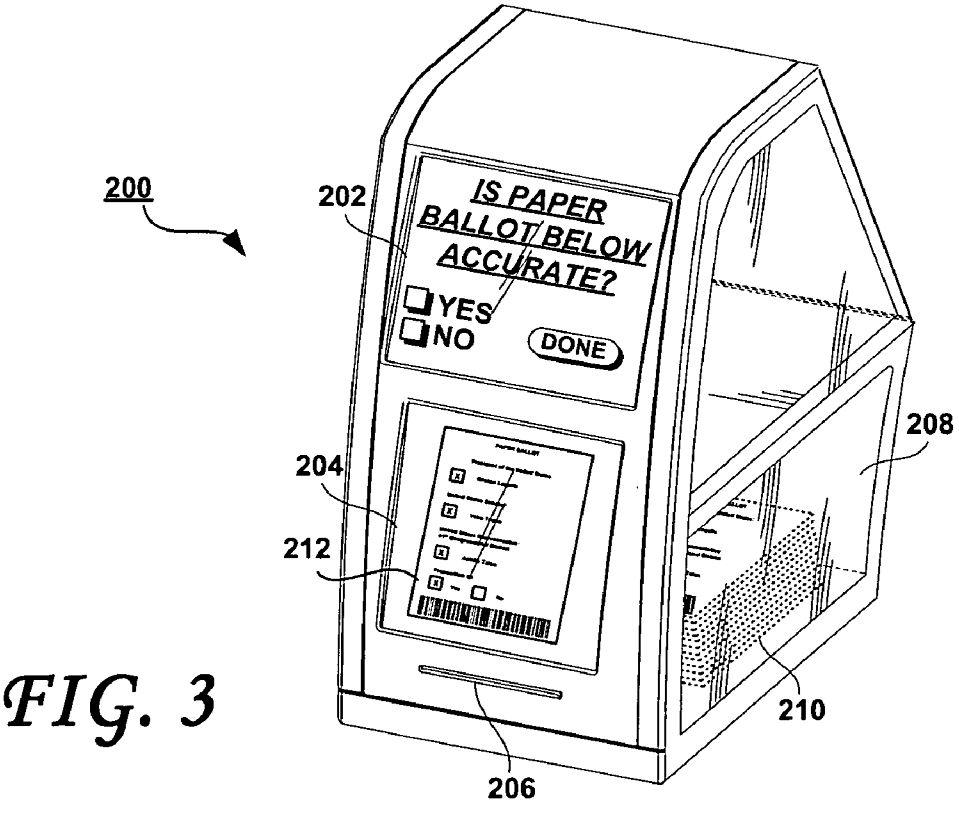
FIG. 3 shows the exemplary voting machine of FIG. 2 in a second state, according to an embodiment of the present invention.

FIG. 3 shows the exemplary voting machine 200 in a second state, according to an embodiment of the present invention. As shown therein, after the voter has made all of his or her voting choices, the voting machine 200 will print out a paper ballot memorializing the choice the voter has made on the touch screen 202. The ballot, shown at 212 in FIG. 2, may then be presented through a transparent window 204 for the voter's inspection and approval. Note that the voter can only see the just-printed ballot 212, but cannot in any way touch or alter it. In this state, the voting machine may prompt the voter, through the touch screen 202, to indicate that the paper ballot 212 visible through the window 204 accurately reflects the voter's intentions. Once the voter agrees that the paper ballot is accurate, the paper ballot 212 is automatically and without human intervention conveyed to the lockbox 208, where it may rest on top of the stack 210 of previously completed ballots. Provisions may be made within the present electronic voting machine 200 to segregate paper ballots 212 that have not been approved by the voter and to allow the voter to start the voting process over again.

Figure 4:
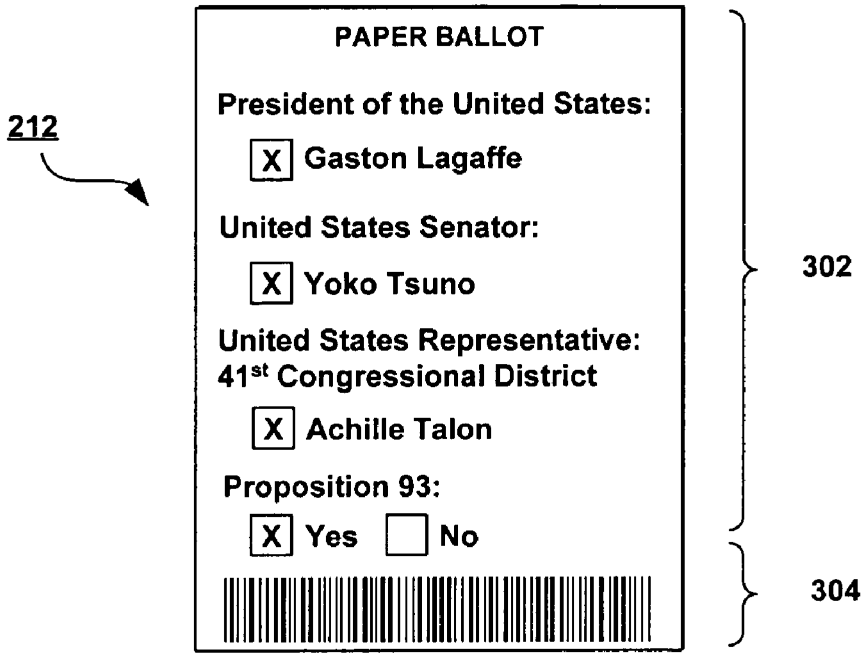
FIG. 4 shows an exemplary paper ballot printed by the present voting machine.

FIG. 4 shows an exemplary paper ballot 212 printed by the present voting machine. Preferably, the present electronic voting machine is configured to print the ballot 212 such that it includes at least a machine-readable code (such as, for example, a bar code 304) and an English language (or whatever the local language) human readable indication of the voter's intent, as shown at 302. According to an embodiment of the present invention, the present electronic voting machine may be configured so as to afford the voter the option of also printing the paper ballot in one of a plurality of other languages (in addition to, not in place of, English or the local language). For example, if the voter's native language is Chinese, the present electronic voting machine may print the paper ballot in machine-readable code, in English and in Chinese. This ensures that the voter is able to confidently verify that the present electronic voting machine recorded his or her vote accurately. According to an embodiment of the present invention, the paper ballot may include at least English and bar-coded versions of the vote or English, a bar-coded version of the vote and one other language version of the vote, to accommodate non-native speakers. It is to be noted that if embodiments of the present invention are practiced outside of an English speaking country, a native language version of the vote may be substituted for the English version described above and shown in the drawings.

Figure 5:
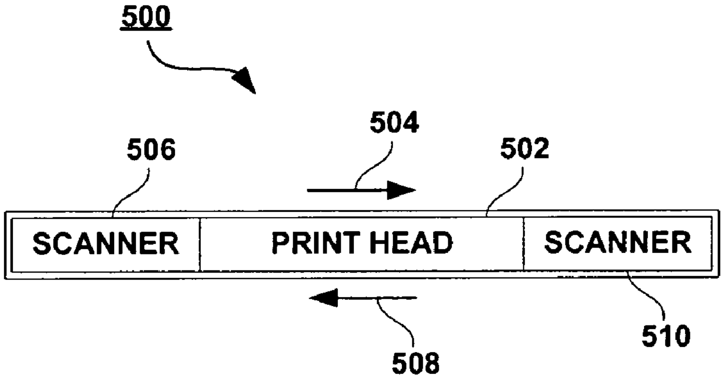
FIG. 5 is a functional block diagram of a portion of the print mechanism of the present voting machine according to an embodiment of the present invention, and illustrates the read-after-print functionality of the present voting machine.

To insure that the electronic record of the voting is the same as the voting memorialized by the paper ballot, an embodiment of the present voting machine calls for one or more scanners (or other means for reading the printed ballot) that are configured to read the just-printed ballot 212. Preferably, the scanner or scanners are coupled (i.e., physically attached) to the print head of the mechanism that prints the paper ballot, so that the scanner(s) move together with the print head as the voting machine print head is moved during printing operations. FIG. 5 is a functional block diagram of a portion of the print mechanism 500 of the present voting machine according to an embodiment of the present invention, and illustrates the read-after-print functionality of the present voting machine. For unidirectional printing mechanisms, a single scanner 506 or 510 may be attached to the trailing edge of the print head (depending upon the direction of travel 504, 508 of the print head 502 during printing operations), and configured to read as or immediately after the printer prints. For bidirectional print mechanisms as shown in FIG. 5, one scanner 506 may be attached to one side of the print head 502 and another scanner 510 may be attached to the other side of the print head 502, to enable immediate read-after-print functionality irrespective of the current direction 504, 508 in which the print head 502 is traveling. For other print mechanisms (e.g., those who do not print using a reciprocating motion), one or more scanners or readers should be disposed so as to read what the print head prints immediately after the print head has printed or as the print head prints. In this manner, the scanner(s) or reader(s) may be configured to read the printed indicia on the paper ballot immediately after the printing has taken place. The read indicia may then be processed and stored in memory for later tabulation.

Embodiments of the present invention envisage two separate and independent data paths for the information generated by the voter. The two separate and independent data paths are created immediately prior to the voter validation of the paper ballot. A first data path may include the record of the voter's voting choices, as acquired by the machine's user interface as the voter makes his or her choice. Such first data path may be acquired, for example, by selectively populating data fields with the voter's choices as the voter makes selections on the voting machine's touch-sensitive screen (or other input means) or after the voter has validated the printed ballot 212. The second data path, which is independent of the first data path, may be acquired by the read-after-print functionality of the present electronic voting machine shown at FIG. 1 at step S15 and as described relative to FIG. 5. Indeed, the present voting machine may also record the voter's choices by reading the bar code 304 (or other machine-readable indicia) as it is being printed on the paper ballot 212. The bar code or other machine-readable indicia 304 printed on the paper ballot 212, when decoded, provides a separate record of the voting choices made by the voter and printed on the paper ballot 212. This separate record is also stored in a secure data store for later transmission and processing.

The combination of independent data paths obtained from the voter's choices as he or she interacts with the voting machine's user interface and from the read-after-print information provides a reliable record of the voter's intent. When combined with the tangible and persistent nature of the voter-verified printed ballot 212 generated by the present electronic voting machine, embodiments of the present invention provide a secure, fully auditable record of the vote, and provide independent basis for carrying out meaningful hand or machine recounts and audits of voting processes and administration. In case of discrepancies between the tally of the electronic votes and the tally of the paper ballots (such as during a recount, for example), the paper ballots control. That is, the tally of the paper ballots should be relied on over the tally of the votes obtained from the central database(s) to which the present voting machines have transmitted the voters' choices.

The printed ballots secured in the locked and numbered box 208 of the present voting machine 200 may then be forwarded by the Post Office or by other means in a secure manner to the local voting authorities, as described in greater detail below relative to FIG. 7.

Embodiments of the present invention also apply to the special circumstances of the absentee voter and provide the same functionality and security as detailed above relative to non-absentee or local polling place voting. According to an embodiment of the present invention, each local election authority prepares voter-specific cards, one for each voter. Such voter-specific cards may advantageously be electronically readable, encrypted, and readable by voting machines. Each card will contain information specific to the voter about the appropriately configured ballot the voter may use in voting. Thus a voter at a remote polling place, voting as an absentee, may employ the proper ballot based on the information in the voting card. One such card may be issued to each registered absentee voter, on demand. Such cards may be issued only for absentee voters or may be issued and distributed to appropriate registered voters, either at the time and place of the formal vote or in advance of voting day. In the case of absentee ballot applications, such cards may be sent through the postal service (for example) to the voter at the address listed on the registration or, in the case of military personnel, to the appropriate APO address.

Preferably, the remotely located absentee ballot applicant receives his or her voter-specific card c/o a Post Office if away from home within the US, or receives the card c/o a recipient-designated US Embassy, US Consulate, or US military unit (for example), if abroad. According to an embodiment of the present invention, the voter-specific card 214 is good and valid only for a single act of voting, will contain encrypted identification, and will be mapped to the issued information distributed to potential voting places by local voting authorities through the U.S. Post Office. The voter-specific cards 214 may include a magnetic strip and resemble a credit card. Alternatively, the voter-specific cards 214 may use other means to store and secure the encrypted voter identification and other information.

Figure 6:
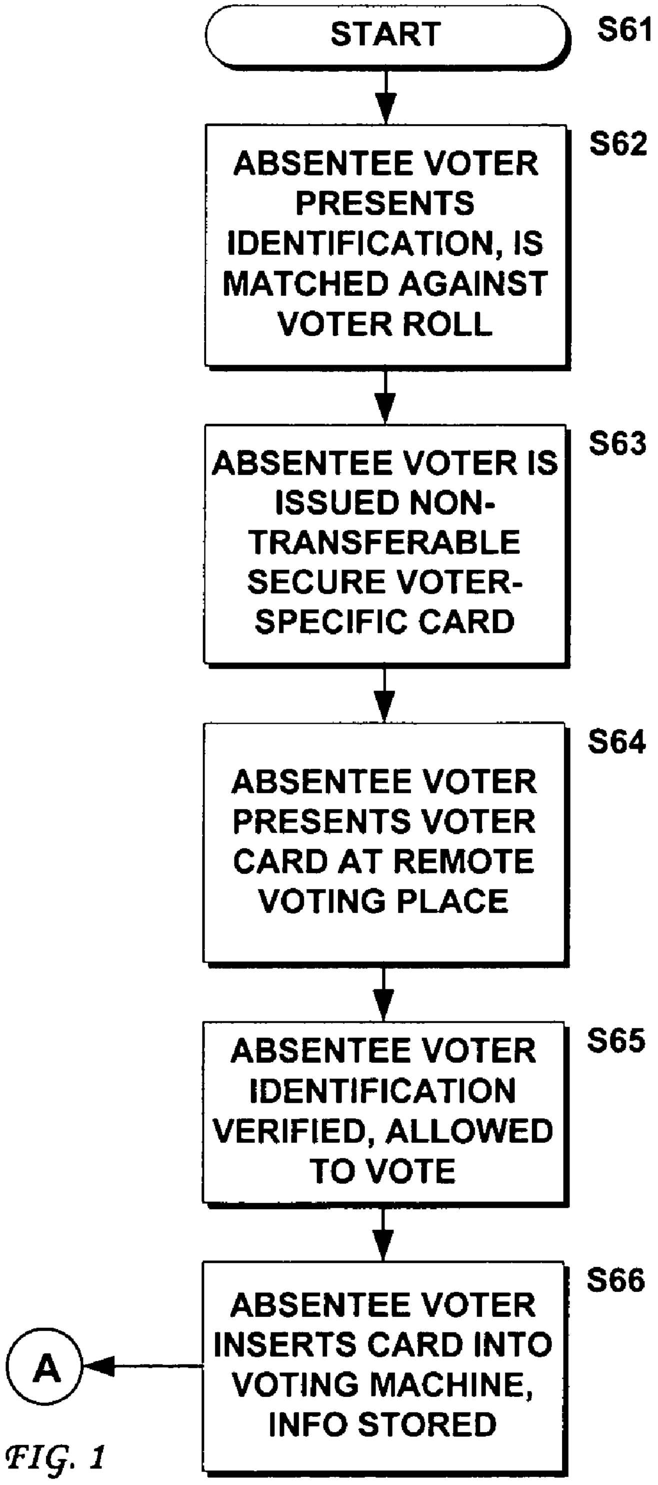
FIG. 6 is a flowchart illustrating further aspects of the present voting method, as it applies to absentee voters.

FIG. 6 is a flowchart illustrating further aspects of the present voting method, as it applies to absentee voters. The method starts at S61, whereupon the absentee voter presents his or her identification and is identified to the satisfaction of the local voting authorities, matched against their list of voters as shown at S62. At S63, the identified absentee voter is then issued a (non-transferable) voter-specific card 214. According to an embodiment of the present invention, such voter-specific cards may be issued to both non-absentee and absentee voters, and the only difference will be the time and location where they are used, either the local polling place or the Post Office station, or the Embassy/Consulate or the US Military polling place. In addition, such absentee voter-specific cards (or tokens) 214 may store some form of authorization that allows them to be used outside of the voter's home precinct. In this manner, absentee voter-specific cards 214 may be issued by the voter registrar or other voting authority and may be configured to store both the information contained in non-absentee voter cards, as well as the above described authorization to use the card outside of the voter's home precinct. Conversely, non-absentee voter-specific cards (or tokens) do not include such authorization, making them usable only in the voter's home precinct. When it is time to vote, the absentee voter presents the voter-specific card issued in step S63 to a designated remote voting place (U.S. embassy, military installation, etc.) as shown at S64. The absentee voter's identification may be verified and the absentee voter may then be allowed to vote under supervision, in the same manner as non-absentee voters. The absentee voter may then introduce his or her voter-specific absentee card 214 into the slot 206 of a voting machine, such as shown at 200 in FIGS. 2 and 3. The encrypted information on the voter-specific card 214 (or other secure functionally similar token) is decrypted, verified and stored as shown at S66. The present voting machine may then initiate a secure communication session with the absentee voter's local voting precinct or with some other voting authority to verify the absentee voter registration status, to ensure that the absentee voter is indeed allowed to vote. This verification may take the form of a query to a database of voter registration information over a secure communication channel, for example. According to an embodiment of the present invention, the voter-specific card 214 introduced into the present electronic voting machine 200 may then be erased and/or captured; i.e., not surrendered back to the voter. The (absentee or non-absentee) voter is then allowed to vote, and the present method may then revert to point "A" in FIG. 1, and the voter is then free to cast his or her electronic ballot in the same manner described above relative to non-absentee voters. It can be seen, therefore, that the voting procedures for absentee voters are near identical to that of non-absentee voters, but for the advance issuance of the voter-specific absentee card to the absentee voter. Once the voter has finished making his or her choices on the voting machine's touch screen 202 or other input device, the printed ballot 212 corresponding to the voter's choice(s) will be validated by the voter (by, e.g., the voter examining the printed ballot 212 through the transparent window 204 to ensure that it accurately reflects his or her voting choices) and the voter-validated printed ballot 212 may then be conveyed by the voting machine's printer to the locked and numbered ballot box 208 (e.g., removably attached to the voting machine or an integral part of the voting machine 200) to be forwarded to the proper election authorities. The later step of distributing the secured paper ballots for recount purposes may be handled by the U.S. Post Office by, e.g., registered mail.

Figure 7:
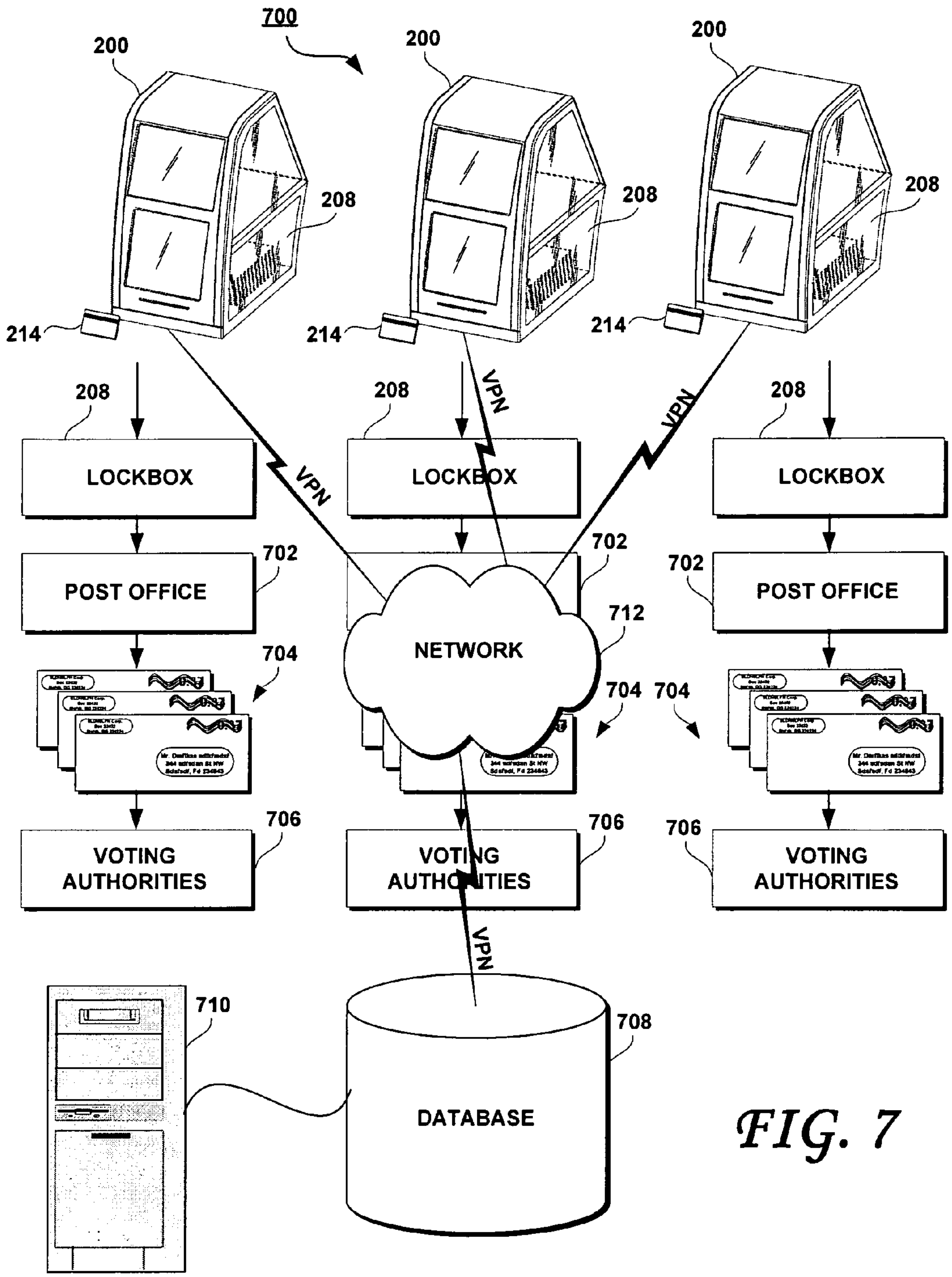
FIG. 7 is an illustration that shows various aspects of the voting systems and methods, according to embodiments of the present invention.

FIG. 7 is an illustration that shows various aspects of the voting systems and methods, according to embodiments of the present invention. As shown therein, the system 700 may include a plurality of voting machines 200 having the functionality described above. The plurality of voting machines 200 may be widely geographically distributed, or may be co-located within a single polling place. The votes acquired by each of the voting machines 200 may be securely transmitted over a computer network 712 (which may include the Internet) to one or more databases 708 for later access by one or more computers 710 to tally the results, conduct audits and/or recounts. The secure transmissions of the votes over the network 712 may be carried out over secure communication channels, such as Virtual Private Networks (VPNs), for example. The U.S. Post office 702 or other authorized agency may then collect the ballots 212 within the lockboxes 208. To do so, the printed ballots 212 may be removed from the voting machine 200 or the lockbox portion 208 of the voting machines 200 may be detached from the voting machines 200 and physically transferred to the Post Office 702 for further handling.

The Post Office 702 or other authorized agency may then remove the printed ballots 212 from the lockboxes 208 and seal the printed ballots 212 and place them within envelopes 704, addressed to the voter's local polling authority. The Post Office 702 preferably seals each envelope 704 in such a manner that it cannot be opened without destroying the envelope 704. The envelope 704 may be lined such that the printed ballot 212 cannot be read from outside the envelope 704. For example, the envelope 704 in which the paper ballots 212 may be sealed and include a lining comprising a thin coating of radiopaque material sufficient to defeat x-ray or similar scanning. The purpose of the envelope security is to prevent reading and selective disposition (e.g., destruction) of specific ballots.

After having sealed and addressed the envelopes containing the printed ballots 212, the Post Office 702 may return the envelopes as priority registered mail (for example) to the addressed local election authorities 706, tracking them to ensure that each ballot reaches it intended recipient 706.

Upon receipt by the respective local election authorities 706, each printed ballot 212 may be securely held and made available for automated or manual recounting at the discretion of the local authorities and according to the laws of each state and the federal government.

The results reflecting the voter's choices in each absentee ballot cast using the voting machines 200 described herein may be sent through a VPN or through some other encrypted secure communications channel so that absentee electronic votes arrive before or during the time of the normal polling within each state. It is further anticipated that the mailed printed ballots 212 will arrive in time for any recount that may be ordered. In each case, the voting card 214, itself will have the address of the local authority that issued it, thereby enabling the Post Office 702 to forward each ballot 212 to the proper address. In this manner, the handling of absentee votes is not significantly different from the handling of votes cast by non-absentee voters at their local polling places.

Those of skill in this art will recognize that various modifications of the systems and methods described herein are possible. For example, to accommodate individuals with special needs, the electronic voting machines or selected ones of the machines 200 may be equipped with secure means for synthesized speech to assist them in making choices and to verify the generated paper ballot, earphones, Braille mechanisms or other sensory feedback means. For example, the present voting machines may be fitted with a deformable screen that provides Braille feedback to the voter. Other variations may occur to those of skill, and all such variations are deemed to fall within the purview and scope of the described embodiments of the present inventions.

What is claimed is:

1. An electronic voting machine, comprising:

a user interface configured to enable a voter to enter voting choices;

a display for displaying the user interface and the voting choices;

a print mechanism configured to print the voting choices on a paper ballot, and a scanner assembly attached to the print mechanism to scan the printed voting choices on the paper ballot immediately after the print mechanism prints the voting choices on the paper ballot so as to generate an electronic version of the voting choices that are printed on the paper ballot, the scanner assembly including a first scanner attached to a first side of the print mechanism and a second scanner attached to a second side of the print mechanism to scan the voting choices immediately after the print mechanism prints the voting choices on the paper ballot irrespective of a direction of travel of the print mechanism.

2. The electronic voting machine of claim 1, wherein the print mechanism and the scanner assembly are configured to operate simultaneously.

3. The electronic voting machine of claim 1, wherein the scanner assembly is attached to a trailing edge of the print mechanism to enable the scanner assembly to scan the voting choices immediately after the print mechanism prints the voting choices on the paper ballot.

4. The electronic voting machine of claim 1, wherein the print mechanism is unidirectional.

5. The electronic voting machine of claim 1, further including a memory for storing the generated electronic version of the voting choices and the voting choices entered by the voter through the user interface.

6. The electronic voting machine of claim 1, further including means for securely sending the voting choices entered by the voter through the user interface and the generated electronic version of the voting choices scanned from the paper ballot to a remote database.

7. The electronic voting machine of claim 1, wherein the display includes a touch screen.

8. The electronic voting machine of claim 1, further including a box configured to hold the printed paper ballots.

9. The electronic voting machine of claim 1, further including a magnetic card reader configured to accept and read a voter-issued magnetic card.

10. The electronic voting machine of claim 9, wherein the electronic voting machine is further configured to erase the voter-issued magnetic cards.

11. A computer-implemented method of recording voter choices using an electronic voting machine, the electronic voting machine including a transparent window, the method comprising the steps of:

presenting the voter with a plurality of voting choices via an electronic user interface;

accepting the voter's choices and storing the voter's choices;

printing a paper ballot that reflects the voter's choices, the paper ballot including at least one of printed human and machine-readable indicia and, while the paper ballot is being printed, optically scanning the just printed indicia to generate an electronic version of the voter's choices that are printed on the paper ballot;

showing the printed paper ballot to the voter through the transparent window;

obtaining a confirmation from the voter that the printed paper ballot shown through the transparent window is accurate, and validating the voter's choices only upon obtaining the voter's confirmation that the printed paper ballot is accurate, and storing the generated electronic version of the voting choices printed on the paper ballot.

12. The computer-implemented method of claim 11, further including a step of identifying the voter prior to the accepting step.

13. The computer-implemented method of claim 11, further including a step of accepting a voter identification card presented by the voter and reading the accepted voter identification card.

14. The computer-implemented method of claim 13, further including a step of erasing the accepted voter identification card.

15. The computer-implemented method of claim 13, wherein the voter in the voter identification card accepting step is an absentee voter.

16. The computer-implemented method of claim 13, further including determining whether the voter having presented the voter identification card is entitled to vote from information obtained during the reading step.

17. The computer-implemented method of claim 13, further comprising a step of determining which ballot the voter is entitled to use from information obtained during the reading step.

18. The computer-implemented method of claim 17, wherein the printing step prints out only the ballot that the voter is entitled to use.

19. The computer-implemented method of claim 11, wherein the accepting step is carried out via a touch screen on the electronic voting machine.

20. The computer-implemented method of claim 11, further comprising steps of:

sending the stored voter's choices obtained via the user interface to a remote database;

sending the generated electronic version of the voter's choices printed on the paper ballot to the remote database.

21. The computer-implemented method of claim 11, wherein the electronic voting machine includes a touch screen and wherein the presenting and accepting steps are carried out using the touch screen.

22. A machine-readable medium having data stored thereon representing sequences of instructions which, when executed by a computing device, causes the computing device to record voter choices using an electronic voting machine, the electronic voting machine including a transparent window, the method, by carrying out steps including:

presenting the voter with a plurality of voting choices via an electronic user interface;

accepting the voter's choices and storing the voter's choices;

printing a paper ballot that reflects the voter's choices, the paper ballot including at least one of printed human and machine-readable indicia and, while the paper ballot is being printed, optically scanning the just printed indicia to generate an electronic version of the voter's choices that are printed on the paper ballot;

showing the printed paper ballot to the voter through the transparent window;

obtaining a confirmation from the voter that the printed paper ballot shown through the transparent window is accurate, and validating the voter's choices only upon obtaining the voter's confirmation that the printed paper ballot shown through the transparent window is accurate, and storing the generated electronic version of the voting choices printed on the paper ballot.

23. The machine readable medium of claim 22, further including a step of identifying the voter prior to the accepting step.

24. The machine readable medium of claim 22, further including a step of accepting a voter identification card presented by the voter and reading the accepted voter identification card.

25. The machine readable medium of claim 24, further including a step of erasing the accepted voter identification card.

26. The machine readable medium of claim 24, wherein the voter in the voter identification card accepting step is an absentee voter.

27. The machine readable medium of claim 24, further including determining whether the voter having presented the voter identification card is entitled to vote from information obtained during the reading step.

28. The machine readable medium of claim 24, further comprising a step of determining which ballot the voter is entitled to use from information obtained during the reading step.

29. The machine readable medium of claim 28, wherein the printing step prints out only the ballot that the voter is entitled to use.

30. The machine readable medium of claim 22, wherein the accepting step is carried out via a touch screen on the electronic voting machine.

31. The machine readable medium of claim 22, further comprising steps of:

sending the stored voter's choices obtained via the user interface to a remote database;

sending the generated electronic version of the voter's choices printed on the paper ballot to the remote database.

32. The machine readable medium of claim 22, wherein the electronic voting machine includes a touch screen and wherein the presenting and accepting steps are carried out using the touch screen.

33. A computer system for recording voter choices using an electronic voting machine, the electronic voting machine including a transparent window, the method, the computer system comprising:

at least one processor;

at least one data storage device coupled to the at least one processor;

a plurality of processes spawned by said at least one processor, the processes including processing logic for:

presenting the voter with a plurality of voting choices via an electronic user interface;

accepting the voter's choices and storing the voter's choices;

printing a paper ballot that reflects the voter's choices, the paper ballot including at least one of printed human and machine-readable indicia and, while the paper ballot is being printed, optically scanning the just printed indicia to generate an electronic version of the voter's choices that are printed on the paper ballot;

showing the printed paper ballot to the voter through the transparent window;

obtaining a confirmation from the voter that the printed paper ballot shown through the transparent window is accurate, and validating the voter's choices only upon obtaining the voter's confirmation that the printed paper ballot shown through the transparent window is accurate, and storing the generated electronic version of the voting choices printed on the paper ballot.

34. The computer system of claim 33, further including a step of identifying the voter prior to the accepting step.

35. The computer system of claim 34, further including a step of accepting a voter identification card presented by the voter and reading the accepted voter identification card.

36. The computer system of claim 35, further including a step of erasing the accepted voter identification card.

37. The computer system of claim 35, wherein the voter in the voter identification card accepting step is an absentee voter.

38. The computer system of claim 35, further including determining whether the voter having presented the voter identification card is entitled to vote from information obtained during the reading step.

39. The computer system of claim 35, further comprising a step of determining which ballot the voter is entitled to use from information obtained during the reading step.

40. The computer system of claim 39, wherein the printing step prints out only the ballot that the voter is entitled to use.

41. The computer system of claim 34, wherein the accepting step is carried out via a touch screen on the electronic voting machine.

42. The computer system of claim 34, further comprising steps of:

sending the stored voter's choices obtained via the user interface to a remote database;

sending the generated electronic version of the voter's choices printed on the paper ballot to the remote database.

43. The computer system of claim 34, wherein the electronic voting machine includes a touch screen and wherein the presenting and accepting steps are carried out using the touch screen.

* * * * *